United States Patent
van Daalen

(10) Patent No.: US 10,334,710 B1
(45) Date of Patent: Jun. 25, 2019

(54) REFRIGERATOR LIGHT DIMMER

(71) Applicant: Johanna C. van Daalen, Palm Bay, FL (US)

(72) Inventor: Johanna C. van Daalen, Palm Bay, FL (US)

( * ) Notice: Subject to any disclaimer, the term of this patent is extended or adjusted under 35 U.S.C. 154(b) by 0 days.

(21) Appl. No.: 15/139,527

(22) Filed: Apr. 27, 2016

Related U.S. Application Data

(60) Provisional application No. 62/153,028, filed on Apr. 27, 2015.

(51) Int. Cl.
*F25D 27/00* (2006.01)
*H05B 37/02* (2006.01)

(52) U.S. Cl.
CPC ....... *H05B 37/0281* (2013.01); *F25D 27/005* (2013.01); *F25D 2400/361* (2013.01)

(58) Field of Classification Search
CPC .................................................... F25D 27/005
See application file for complete search history.

(56) References Cited

U.S. PATENT DOCUMENTS

| | | | |
|---|---|---|---|
| 4,109,231 A | 8/1978 | Krouse | |
| 5,004,957 A | 4/1991 | Cunningham | |
| 6,114,813 A | 9/2000 | Lo et al. | |
| 6,483,695 B1 * | 11/2002 | Hartstein | F25D 29/005 361/679.09 |
| 6,804,974 B1 * | 10/2004 | Voglewede | F25D 23/126 362/276 |
| 7,568,358 B2 * | 8/2009 | Wetekamp | F25C 5/005 222/146.6 |
| 7,906,916 B2 | 3/2011 | Gehman | |
| 7,959,313 B2 * | 6/2011 | Park | F25D 27/005 362/231 |
| 8,816,752 B2 * | 8/2014 | Smith | H03K 17/06 327/446 |
| 2007/0268682 A1 * | 11/2007 | Kim | F25D 27/005 362/92 |
| 2008/0224624 A1 | 9/2008 | Richter | |
| 2011/0005258 A1 * | 1/2011 | Audet | F25D 27/005 62/264 |
| 2014/0111118 A1 * | 4/2014 | Kendall | H05B 37/0218 315/362 |
| 2015/0035432 A1 * | 2/2015 | Kendall | F25D 27/005 315/76 |

\* cited by examiner

*Primary Examiner* — Douglas W Owens
*Assistant Examiner* — Pedro C Fernandez
(74) *Attorney, Agent, or Firm* — Cramer Patent & Design, PLLC; Aaron R. Cramer

(57) ABSTRACT

A refrigerator light control system that automatically controls the interior lighting levels of a refrigerator based on the time of the day. The refrigerator light control system includes a dimmer circuit for operatively setting the interior illumination, a user-operated control panel for producing control signals, and a controller for controlling the dimmer circuit to set the interior illumination at a first level during the day and for controlling the dimmer circuit to set the interior illumination at a second level at night.

6 Claims, 3 Drawing Sheets

REFRIGERATOR LIGHT DIMMER

RELATED APPLICATIONS

This application claims the benefit of U.S. Provisional Application No. 62/153,028, which was filed Apr. 27, 2015, the entire disclosures of which are incorporated herein by reference.

FIELD OF THE INVENTION

The presently disclosed subject matter is directed to refrigerator illumination. More particularly the present invention relates to programmable refrigerator light control systems that automatically adjust the interior lighting of refrigerators based on the time of day.

BACKGROUND OF THE INVENTION

Refrigerators do an excellent job of keeping food cold and thus prolonging food's useful shelf life. They have greatly improved our quality of life while helping protect our health. Modern refrigerators are full of technological innovations such as fully customizable interiors, automatic water and ice dispensers, electronic touch screen controls, and the like.

However, one (1) feature of refrigerators that has remained largely unchanged since the first generation of refrigerators is their interior lighting systems. Refrigerator interior lights always come on at full brightness regardless of the time of day. Not only is this an energy waste but it also subjects the user to somewhat "blinding" levels of light at night. This is especially annoying to those who may be suffering from a hangover, a migraine, or otherwise affected by a bright light and are simply trying to retrieve a cold beverage or a late night snack.

Accordingly, there exists a need for refrigerator light control systems that control the interior lighting levels of refrigerators and which modify those interior lighting levels based on the time of day. The development of such refrigerator light control systems would alleviate problems associated with refrigerator interior lighting. Such refrigerator light control systems would provide for an enhanced refrigerator usage experience. Preferably, such refrigerator light control systems could be implemented at low cost and a manner that is easy to use and effective.

SUMMARY OF THE INVENTION

The principles of the present invention provide for refrigerator light control systems that control the interior lighting levels of refrigerators and which automatically modify refrigerator interior lighting levels based on the time of the day. The inventive refrigerator light control system enables automatic adjustments of the interior lighting levels based on the time of day to provide an enhanced refrigerator usage experience. The inventive refrigerator light control system can be implemented at low cost and in a manner that enables quick, easy, and effective control of the interior light level of a refrigerator.

A refrigerator light control system in accord with the present invention includes a refrigerator having interior illumination, a dimmer circuit for operatively setting that interior illumination, a user-operated control panel for producing control signals, and a controller for controlling the dimmer circuit to set the interior illumination at a first level during the day and for controlling the dimmer circuit to set the interior illumination at a second level at night.

The control signals may include a first time set point that the controller uses to cause when the dimmer circuit sets the interior illumination at the first level. The control signals may further include a first dimmer intensity level that the controller uses to cause the dimmer circuit to set the first level. Those control signals may also include a second time set point that the controller uses to cause when the dimmer circuit sets the interior illumination at the second level as well as a second dimmer intensity level that the controller uses to cause the dimmer circuit to set the second level.

In practice the control signals may also include an OFF signal set by an OFF switch that command the controller to cause the dimmer circuit to turn the interior illumination off. That OFF signal may also be used to enable a user to program the first time set point and the second time set point as well as the first level and the second level.

The control signals can also include a first time control signal that is from a first set point increasing switch that the controller uses to change the first time set point as well as possibly a first dimmer control signal from a first dimmer switch that the controller uses to change the first level.

The control panel may also include a display for assisting a user to program the controller. That display may be located on a refrigerator door, preferably on the exterior of the door. The display can beneficially include a time display that displays at least the first time set point.

The controller is a preferably a programmable microcontroller and the dimmer circuit preferably includes a thyristor such as a triac. The dimmer circuit should include a zero crossing detector. The refrigerator light control system should also include a power supply for powering at least the controller.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | dimming apparatus |
| 15 | standard refrigerator |
| 20 | dispensing system |
| 25 | control panel |
| 30 | door light OFF switch |
| 35 | door light ON switch |
| 40 | first time set point |
| 45 | second time set point |
| 55 | first time display |
| 60 | first dimming level display |
| 65 | first increase time push-button |
| 70 | first decrease time push-button |
| 75 | first increase dimming level push-button |
| 80 | first decrease dimming level push-button |

-continued

| | |
|---|---|
| 85 | second time display |
| 90 | second dimming level display |
| 95 | second increase time push-button |
| 100 | second decrease time push-button |
| 105 | second increase dimming level push-button |
| 110 | second decrease dimming level push-button |
| 115 | control circuit |
| 120 | power supply |
| 125 | main power cord |
| 130 | dimmer circuit |
| 135 | interior lamp |
| 140 | control input |
| 145 | resistor |
| 150 | diode |
| 155 | capacitor |
| 160 | zener diode |
| 165 | integrated circuit |
| 170 | triac |
| 175 | power input |

DETAILED DESCRIPTION OF THE PREFERRED EMBODIMENT

The preferred embodiment of the present invention is depicted in FIGS. 1-4. However, the invention is not limited to the specifically described and illustrated embodiment. A person skilled in the art will appreciate that many other embodiments of the invention are possible without deviating from the basic concept of the invention and that any such work around will also fall under the scope of this invention.

In the figures like numbers refer to like elements throughout. Additionally, the terms "a" and "an" as used herein do not denote a limitation of quantity, but rather denote the presence of at least one (1) of the referenced items.

Figure 1:
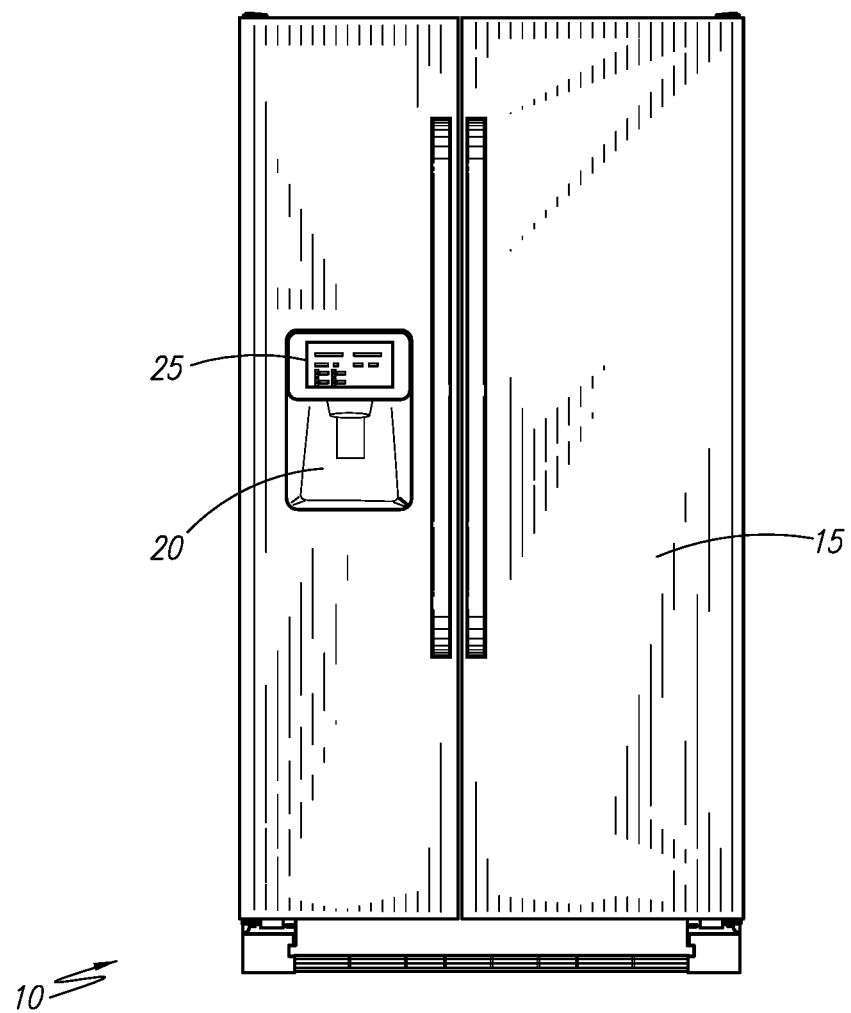
FIG. 1 is a front view of a refrigerator light control system 10 that is in accord with the preferred embodiment of the present invention.

Refer now to FIG. 1 for a front view of a refrigerator that implements a refrigerator light control system (herein referred to as the "system") 10 that is in accord with the present invention. The system 10 is illustrated using a standard refrigerator 15 that is depicted as a side-by-side refrigerator. It should be understood that the exact configuration of the standard refrigerator 15 may vary and that the illustrated standard refrigerator 15 is not intended to be a limiting factor.

The standard refrigerator 15 includes a through-the-door dispensing system 20 such as an ice dispenser or water dispenser. The system 10 receives user input via a control panel 25. The control panel 25 can be a digital touch screen version that is externally visible as depicted in FIG. 1 or an analog version that uses switches, potentiometers and mechanical timers. The inclusion of any specific type or style or location of control panel 25 is not intended to be a limiting factor of the present invention except as defined by the appended claims. The control panel 25 enables a user to control the timing cycles and the various brightness levels of the standard refrigerator 15. A further description of the functionality and operation of the control panel 25 is provided below. Additionally, while the control panel 25 is shown as being on the exterior of the standard refrigerator 15 it can also be located on the interior and can be either a factory installation or an after-market and on.

Figure 2:
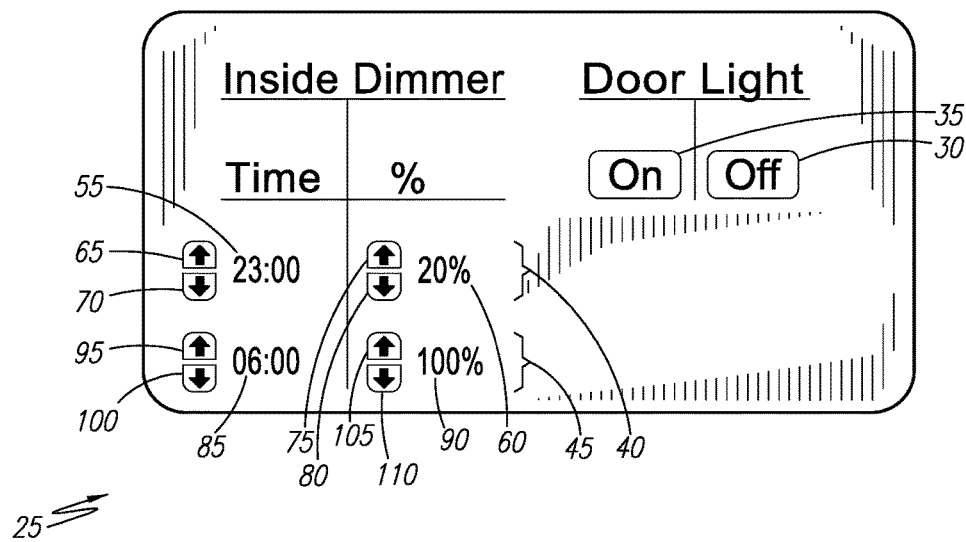
FIG. 2 is a detailed view of the control panel 25 of the refrigerator light control system 10 shown in FIG. 1.

Refer now to FIG. 2 for a more detailed view of the control panel 25. The illustrated control panel 25 has a door light OFF switch 30 that enables turning off the refrigerator interior lighting. That OFF switch 30 also enables programming of the refrigerator light control system 10 (explained in more detail below). Also included is a door light ON switch 35 that is used to activate the refrigerator interior lighting by enabling the functionality of the system 10.

The controls provided by the control panel 25 include a first time set point 40 and a second time set point 45. The first time set point 40 uses a first time display 55 to display the time when the interior light will change and a first dimming level display 60 that controls the interior lighting level at the time set by the first time display 55. The first time display 55 is controlled by a first time increase push-button 65 and by a first time decrease push-button 70. The first time increase push-button 65 and the first time decrease push-button 70 operate in the conventionally expected manner in that pushing one (1) of those buttons changes the first time display 55 (and thus the first time set point 40) in the direction of the pushed button. The first dimming level 60 is controlled by a first increase dimming level push-button 75 and by a first decrease dimming level push-button 80 that again operate in the conventionally expected manner Pushing one (1) of those buttons changes the intensity of the refrigerator interior lighting in the direction of the pushed button.

Likewise, the second set point 45 uses a second time display 85 which displays the time when the interior light will change to the level displayed by a second dimming level display 90. The time of the second set point 45 is controlled by a second increase time push-button 95 and by a second decrease time push-button 100 which operate in the conventionally expected manner Pushing one of those buttons changes the second time display 85 (and thus the second set point 45) in the direction of the pushed button. The second dimming level display 90 is adjusted by a second increase dimming level push-button 105 and by a second decrease dimming level push-button 110. The second dimming level display 90 is adjusted in the conventionally expected manner Pushing one of the buttons 105, 110 changes the second dimming level display and thus the second level of the intensity of the refrigerator interior lighting in the direction of the pushed button.

The forging set points, timers, dimmers and push-buttons enable a user to set a lower light level for late night hours, envisioned to be approximately 11:00 PM to 6:00 am as depicted in FIG. 2. This prevents blinding a user when the user opens the door of the standard refrigerator 15 (see FIG. 1). Likewise, the user can set the system 10 for a higher light level during day time hours, envisioned to be 6:00 am to 11:00 pm to provided adequate light during day time hours for safe and proper use of the standard refrigerator 15 (FIG. 1).

Figure 3:
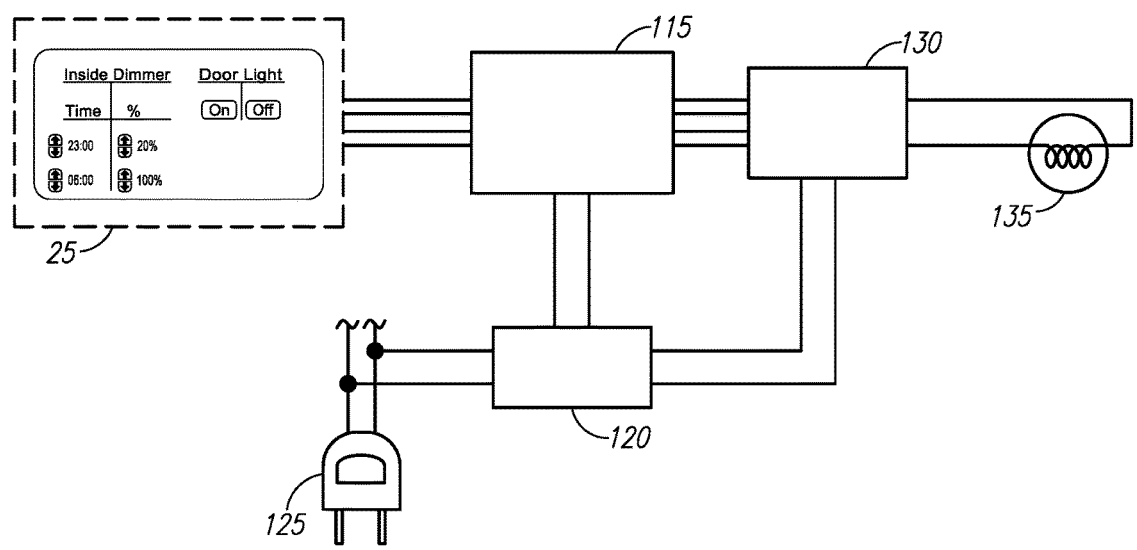
FIG. 3 is an electrical block diagram of the major electrical components of the refrigerator light control system 10 shown in FIGS. 1 and 2; and, FIG. 4 is an electrical schematic diagram of a dimmer circuit 130 used in the refrigerator light control system 10.

Refer now to FIG. 3 for an electrical block diagram of the major electrical components of the system 10. The control panel 25 is electrically connected to a control circuit 115. The control circuit 115 is envisioned as including a standard well-known micro-controller such as a Basic stamp module, an ARDUINO® or an 8051 derivative or the like having internal memory and programmability to allow control of port inputs and outputs. Those skilled in the art will realize that other methods of control are also possible, including hard wired logic, relays, timers and the like. Thus specific devices and methods should not be interpreted as a limiting factor of the present invention unless contained in the appended claims.

The control circuit 115 receives electrical power from a power supply 120 which is in turn connected to the main power cord 125 of the standard refrigerator 15 (as shown in FIG. 1). The control circuit 115 respond to various inputs provided by the control panel 25 (see FIG. 1) as described above. The control circuit 115 outputs control a dimmer circuit 130 which varies the brightness of an interior lamp 135 based on the time of day as programmed using signals from the control panel 25. While the interior lamp 135 is depicted as a single incandescent lamp in practice multiple lamps or lamps of different internal configurations such as fluorescent bulbs or light-emitting diodes (LED's) can also be used.

Figure 4:
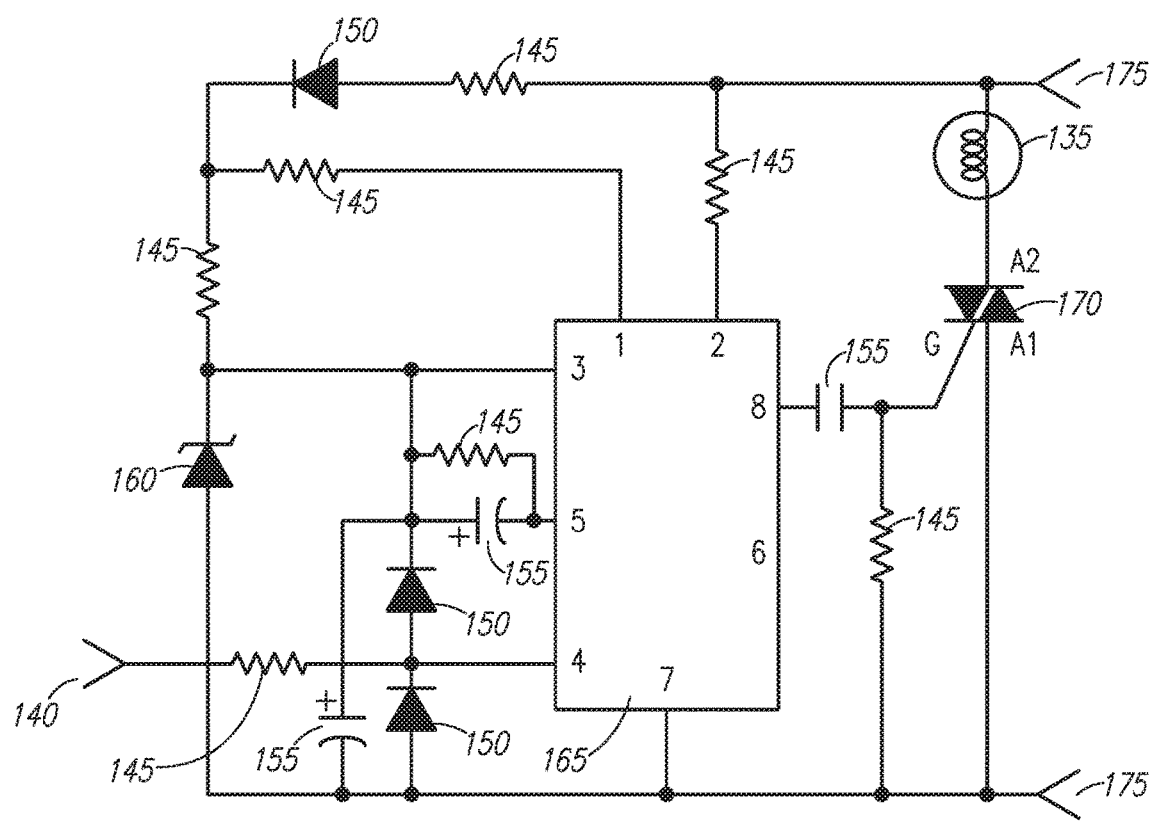

Refer now to FIG. 4 for an electrical schematic diagram of the dimmer circuit 130. As shown an input 140 from the control circuit 115 serves as an input driver (in practice there will be multiple inputs 140 but for simplicity only one is described). The dimmer circuit 130 conditions the input 140 using resistors 145, diodes 150, and capacitors 155. A Zener diode 160 produces a reference voltage which is applied to an integrated circuit 165. The output from the integrated circuit 165 controls a thyristor such as a triac 170 (which may be a BT136) using another capacitor 155 and a resistor 145. The triac 170 in turn controls the power applied to the interior lamp 135 from a set of power inputs 175. Those skilled in the art will understand additional methods of implementing a dimming control such as controlling the triac 175 more directly from the control circuit 115. As such the specific dimming method disclosed in FIG. 4 is not intended to be a limiting factor of the present invention.

As is usual in triac 175 operated switching circuits in consumer applications the dimmer circuit 130 implements a zero-crossing switching scheme to reduce electrical noise.

The preferred embodiment of the present invention can be utilized by the common user in a simple and effortless manner with little or no training. It is envisioned that the system 10 would be constructed in general accordance with FIG. 1 through FIG. 4.

The system 10 would be procured by a user either as an integral part of a new standard refrigerator 15 or as an add on component mounted to either the interior of exterior of the standard refrigerator 15 and installed by the user or by a skilled person. To that end wire connections to the main power cord 125, the interior lamp 135, and the control panel 25 are necessary. The invention would be wired using well known, acceptable, and safe wiring practices that meet local codes and regulations.

To set up the system 10 a user would activate the programming of the system 10 by pressing the door light OFF switch 30. A first set point 40 would be programmed in by using the first increase time push-button 65 or the first decrease time push-button 70 to set the first time display 55 and then the first illumination level would be set using the first increase dimming level push-button 75 and the first decrease dimming level push-button 80 to set the first dimming level display 60. Likewise, a second set point 45 would be programmed in using the second increase time push-button 95 and the second decrease time push-button 100 to set the second time display 85 and the second illumination level would be adjusted using the second increase dimming level push-button 105 and the second decrease dimming level push-button 110 to set the second dimming level display 90. The first time display 55 and the second time display 85 then depict the beginning and the end times of the dimming operation provided by the system 10. The system 10 is then placed into operation by pressing the light ON switch 35.

The operation of the system 10 will run automatically. Should a door of the standard refrigerator 15 be opened during normal daylight hours the interior lamp 135 will operate at one light intensity. Should the door be opened during the night the interior lamp 135 will operate at a reduced light intensity. The operation of the system 10 will continue in the programmed manner until the system 10 is reprogrammed or the door light OFF switch 30 is pressed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A refrigerator light control system, comprising:
a refrigerator having a door and interior illumination;
a dimmer for operatively dimming said interior illumination;
a user operated control panel for producing control signals including an OFF signal, a first illumination level, a second illumination level, a first time at which to set said first illumination level, and a second time at which to set said second illumination level, wherein said first time is set by a variable first time setting switch, wherein said first illumination level is set by a variable first dimmer switch and wherein said OFF signal enables a user to program said first time and said second time, wherein said control panel is mounted on said door, said control panel is mounted on an exterior of said door, said control panel includes a time display, wherein said time display shows said first time;
a controller receiving said control signals, said controller for causing said dimmer to set said interior illumination at said first illumination level after said first time until said second time when said door is open and said OFF signal is not set, said controller further for controlling said dimmer to set said interior illumination at said second illumination level after said second time until said first time when said door is open and said OFF signal is not set; and
an input from said controller serving as an input driver, said dimmer conditions said input using resistors, diodes, and capacitors, a Zener diode produces a reference voltage which is applied to an integrated circuit, said output from said integrated circuit controls a thyristor such as a triac using another capacitor and a resistor, said triac in turn controls power applied to an interior lamp from a set of power inputs, said triac operated switching circuits in consumer applications said dimmer circuit implements a zero-crossing switching scheme to reduce electrical noise.

2. The refrigerator light control system of claim 1, wherein said OFF signal is set by an OFF switch.

3. The refrigerator light control system of claim 1, wherein said OFF signal further enables a user to program said first illumination level.

4. The refrigerator light control system of claim 1, wherein said control panel includes a display panel for assisting a user to program said controller.

5. The refrigerator light control system of claim 1, wherein said controller is a programmable microcontroller.

6. The refrigerator light control system of claim 1, further including a display panel that displays said first illumination level as a percentage of maximum possible illumination.

* * * * *